Figure 1:
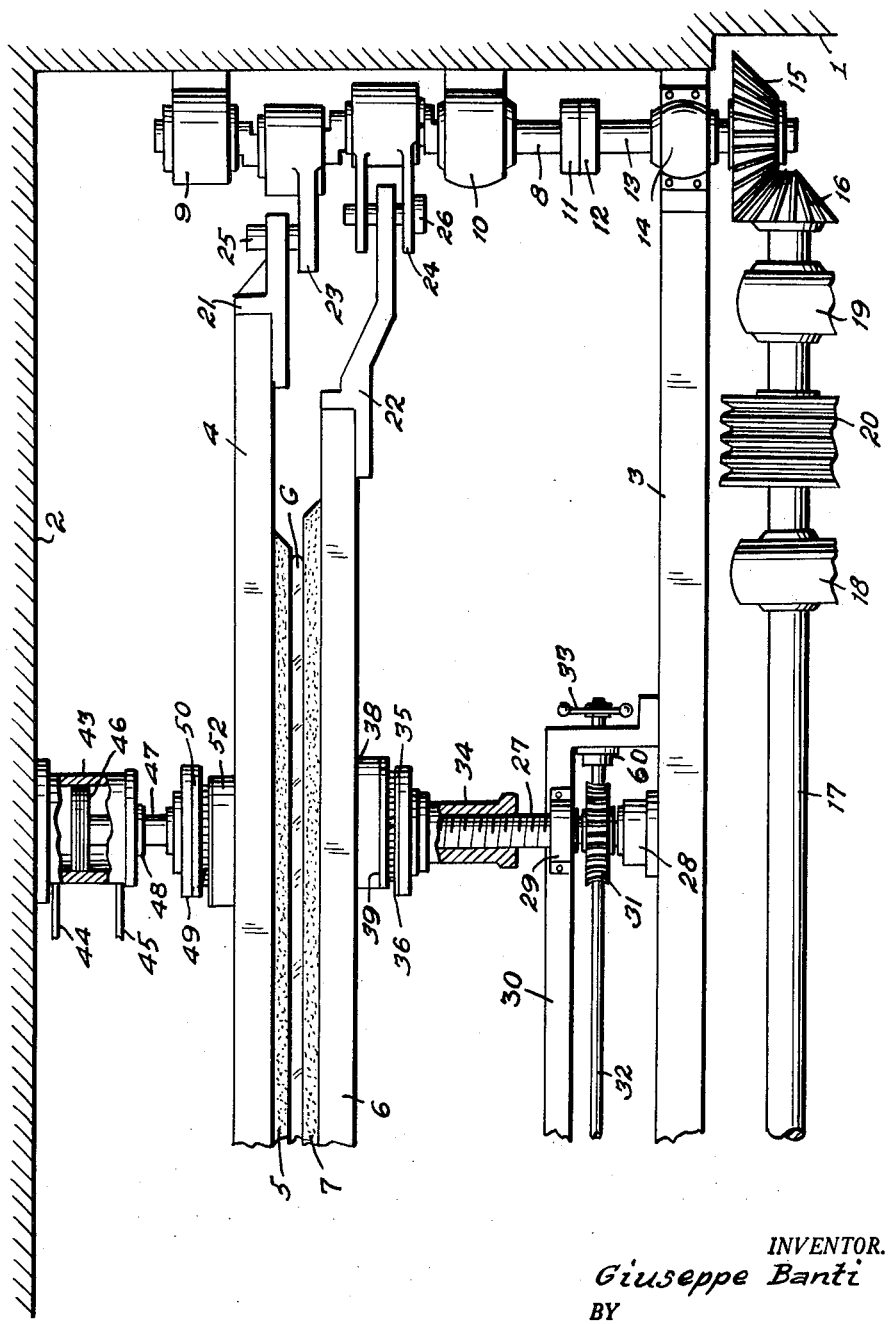

INVENTOR.
Giuseppe Banti

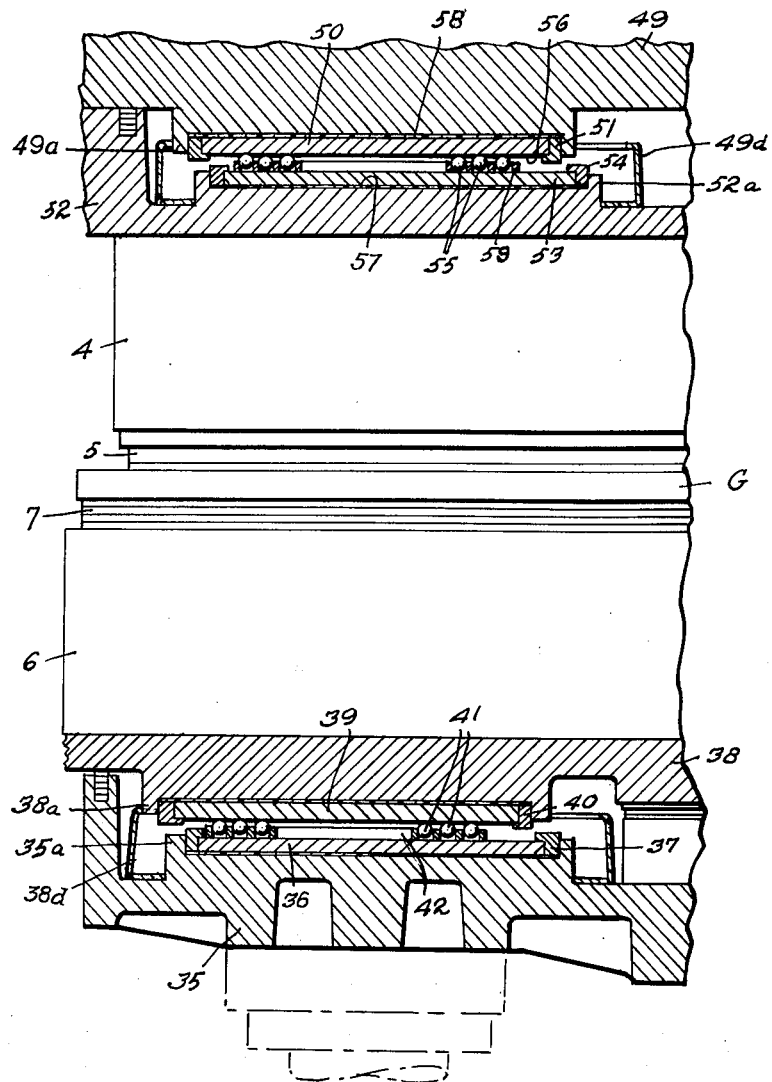

United States Patent Office 3,200,541
Patented Aug. 17, 1965

3,200,541
APPARATUS FOR SURFACING GLASS
Giuseppe Banti, Pisa, Italy, assignor to Compagnie de Saint-Gobain, Neuilly-sur-Seine, France
Filed June 25, 1963, Ser. No. 290,519
Claims priority, application France, June 27, 1962, 902,191
9 Claims. (Cl. 51—112)

This invention relates to machines for grinding and polishing sheets of glass and, more particularly to an improvement over the apparatus disclosed in French Patent 1,171,123.

In machines of the type involved, a sheet of glass to be polished is positioned or continuously translated between horizontal upper and lower flat, parallel, vertically spaced plates. The upper plate has a sheet or layer of felt attached to and over its lower face. Likewise the lower plate has a sheet or layer of felt attached to and over its upper face. The sheet of glass to be ground or polished is positioned between the aforesaid layers and means are provided to press the two plates together with a force generally uniformly distributed over their areas while, at the same time, imparting to them relative oscillations in their respective planes so that the two working layers are moved over and relatively to the respective faces of the glass sheet. The oscillations imparted are advantageously circular translatory motion of small amplitude. In general the construction is such that an area extending completely transversely across the sheet is covered and processed by the aforesaid plates and their coverings of felt, while the glass plate is translated at a controlled rate of movement in the direction of its length.

The plates are necessarily pressed together with considerable force in order to effectively and efficiently grind and polish the sheet of glass. In prior art devices such as that taught by the above-identified French patent, the power required for relative oscillations of the plates is relatively great, with consequent rapid wear of the moving plates, disintegration of the necessary precise parallel motion between the plates, and an imperfect completed product.

The main object of the present invention is to provide a machine of the character stated wherein the parallel planar motions of the upper and lower oscillating plates is established and maintained with great accuracy throughout the life of the machine.

Another object is to provide a machine for grinding and polishing glass sheets, which requires a minimum amount of power for any given transverse size or width of glass plate being processed.

Still another object is to provide a machine wherein both faces of a sheet of glass are polished at the same time, while the pressure of the polishing felts upon the respective faces may be precisely controlled and varied to afford the most efficient and satisfactory rate of polishing.

Yet another object is to provide a construction in a machine of the character stated, wherein the pressure of the grinding or polishing plates upon the respective faces of the sheet of glass, may be increased to a permissible maximum, with a negligible small increase in the power required for effecting oscillation of the plates.

Another object is to provide a glass polishing machine which is compact, easily and quickly adjusted to a wide range of uses in the glass-processing art, long-lived, and a general advance and improvement in the art.

The foregoing and other objects and advantages are attained by providing two generally horizontal superposed polishing plates each equipped with confronting layers of felt which receive the glass sheet between them. Power-driven means are connected with the respective plates to effect relative equal and opposite oscillations thereof, each in its own plane. The lower plate is supported at spaced points by a corresponding number of lower assemblies each including a first, or upper plane bearing surface fixed with the plate and oscillating as a unit therewith, and a lower support including a second stationary plane bearing surface below the first surface. The aforesaid two surfaces are precisely parallel with the plates and a plurality of bearing balls are positioned between them. The lower plate is thus supported for accurate oscillation in its plane, and with a minimum of friction. Means are provided to simultaneously vertically adjust all the aforesaid assemblies to thereby translate the lower plate vertically through limited distances.

An equal number of upper assemblies are provided over the area of the top or upper plate. Each of these upper assemblies includes a fixed vertical pressure cylinder having a piston and rod. The lower end of the vertical, depending rod carries a bearing surface. The upper surface of the upper plate also has a bearing surface. Both surfaces are parallel with the plate and superposed and a plurality of bearing balls are interposed and retained between them. The thrust of each piston is thus translated through the balls of each upper assembly, directly to the sheet being polished, thence to the balls of the lower assembly.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is an elevational view, partly in section, showing one of a plurality of duplicate mounts or assemblies for the aforesaid upper and lower plates; and FIG. 2 is a view to an enlarged scale, partly in section, showing in greater detail the upper and lower anti-friction bearing by which the plates and their felt layers are mounted for guided oscillations over and relatively to the respective faces of the glass sheet.

Referring in detail to the drawings, 1 identifies generally a rigid frame forming a part of the machine and including an upper part 2. The frame also includes a beam 3 fixed at its ends. An upper metallic plate 4 has a sheet of polishing felt 5 attached to its lower surface. Likewise, a lower metallic plate 6 has a sheet of felt 7 attached to its upper surface. The two plates and their respective felt sheets are horizontally parallel and, in operation receive a sheet of glass G between them.

Means are provided to simultaneously impart orbital movements, or oscillations to plates 4 and 6, each in its own plane. In the machine shown, such means comprises a crankshaft 8, FIG. 1, journaled for rotation about a vertical axis in bearings 9 and 10 fixed with frame 1. The crankshaft is provided at its lower end with a coupling or flange 11 secured to flange 12 of shaft 13, journaled in bearing 14 carried by frame 1 for rotation about an axis coincident with that of crankshaft 8. Shaft 13 has a bevel gear 15 meshing with a pinion 16 secured to the contiguous end of drive shaft 17, journalled in bearings 18 and 19, carried by or fixed with frame 1. A V-belt pulley 20 is fixed on shaft 17 and provides means by which the shaft is rotated from any suitable source of power.

Bearing brackets 21 and 22 are secured to plates 4 and 6, respectively, and each is coupled to a corresponding throw of the crankshaft, by connecting rods 23 and 24 each of which has a bearing pin such as 25 and 26. It will be noted from FIG. 1 that the construction is such that each plate 4 and 6, with its bracket 21 and 22, may have limited vertical translation with respect to connecting rods 23 and 24. The two throws of the crankshaft are relatively angularly related at 180° so that, in a manner obvious from inspection of FIG. 1, rotation of the crankshaft in response to rotation of drive shaft 17, oscillates plates 4 and 6 relatively to one another, each in its own plane.

Lower plate 6 is supported at selected spaced locations by a number of supports one of which is shown at FIG. 1 to comprise a vertical threaded shaft 27 journalled at its lower end in two vertically spaced bearings 28 and 29 fixed to the upper surface of beam 3 and a bracket 30, respectively. A worm gear 31 is fixed to shaft 27 between bearings 28 and 29 and meshes with a worm, not shown, fixed to shaft 32. This shaft is journalled in bearings one of which is shown at 60, and carries a hand wheel 33 at its end, to effect turning to the shaft and a corresponding fine rotation of shaft 27. It will be understood that shaft 32 extends to the left from FIG. 1 and has one or more other worms secured to it, each of which effects a like rotation of a corresponding number of gears and threaded shafts, so that all are equally and simultaneously adjusted in the same direction.

Shaft 27 has a sleeve 34 threaded thereon. The sleeve is vertically translatable by and in response to rotation of the shaft but is fixed against rotation. At its top end the sleeve is enlarged to form a support for a bearing plate 36. This plate is conveniently circular in shape. Support 35 is formed with a circular upstanding rim 35a enclosing an area somewhat greater than that of the plate. A bezel or rim 37 fits about the plate, between it and rim 35a and, as shown, is flanged over the plate to hold it firmly to the support.

Lower oscillating plate 6 has been previously described. A projection 38 is fixed to and depends from plate 6 and, like support 35, has a circular rim 38a extending downwardly therefrom to mount a bearing plate 39 which may be identical in size and shape with plate 36 and secured within the area defined by rim 38a, by bezel 40 in the manner previously described for plate 36.

Plate 39 is supported in vertically spaced, parallel relation with plate 36 by a series of steel balls 41. These are, in the machine shown, held in three circular coaxial rows, by a cage 42. The circular size of the cage is less than that of plates 36 and 39, so that plate 6 is mounted for limited, highly precise oscillation in its own plane, which plane may be adjustably translated vertically by rotation of screw 27, as previously described.

Plate 4 is mounted for oscillation in its own plane by mechanism similar to that just described for plate 6. A hydraulic or pneumatic cylinder 43 is fixed to upper part 2 of frame 1, in vertically coaxial relation with screw 27 and has inlet and exhaust pipes 44 and 45 connected with its respective ends by which pressure fluid may be supplied to, and exhausted therefrom. Piston 46 slidably fits the cylinder and has a rod 47 extending downwardly through a gland 48 in the lower cap of the cylinder. Referring more particularly to FIG. 2, rod 47 has a support 49 integral with or fixed to its lower end. This support has a circular rim 49a within which bearing plate 50 is fixed, as by means of bezel 51 in the manner previously described for bearing plates 36 and 39.

Upper plate 4, previously described, has projection 52 fixed therewith and extending upwardly from its upper face or surface. This projection has a circular rim 52a within which bearing plate 53 is fixed by means of bezel 54.

Plates 50 and 53 are parallel and superposed and have bearing balls 55 interposed between their confronting plane surfaces 56 and 57. As described for bearing balls 41, balls 55 are arranged and held in three concentric circular rows by cage 56.

A layer or film of plastic material is interposed between each of the aforesaid bearing plates 36, 39, 50 and 53, and its respective support 35, 38, 49, and 52. These are identified, for example, at 57, FIG. 2, for plate 53, and 58 for plate 50.

The operation will be clear from the foregoing description. Handwheel 33 having been rotated to effect the desired vertical position of lower plate or support 6, for the thickness of glass to be polished, sheet G is fed between felt layers 5 and 7 in the direction generally normal to the plane of FIG. 1. Rapid rotation of crankshaft 8 effects corresponding relative oscillations of plates 4 and 6. The necessary pressure of the felt upon the respective faces of the glass sheet is produced by the regulated admission of pressure fluid to the upper end of cylinder 43, through pipe 44 while allowing fluid to exhaust from the lower end of the cylinder through pipe 45. Likewise, pressure may be reduced by connecting pipe 45 with the source of fluid pressure while allowing it to exhaust from pipe 44. Suitable valve means, not shown, thus enable a very precise control of the pressure of the polishing felts upon the faces of the glass sheet. Since the pressure exerted upon the sheet is relatively great, the antifriction bearings provided by the structure including balls 41 and 55 maintains at a minimum the power required for operation of the machine, and permits a relative increase in speeds, with consequent reduction of time and expense per unit area of sheet.

It will be understood that plates 50, 53, etc., may be of shapes other than circular, so long as their area is sufficiently greater than cage 56, to enable free movement of plates 4 and 6 under actuation by crankshaft 8.

While the presently preferred form of the invention has been illustrated and described, alteration of shape and form, and substitutions of equivalents will readily occur to those skilled in the art after a study of the foregoing specification. Hence the disclosure should be taken in an illustrative, rather than a limiting sense. Within the scope of the subjoined claims, all such modifications are reserved.

As many apparently widely different embodiments of the present invention may be made without departing from the spirit and scope thereof, it is to be understood that the invention is not limited to the specific embodiments.

What is claimed is:

1. In an apparatus for simultaneously surfacing both faces of a sheet of glass, a lower, horizontally disposed plate, oscillatable in its plane, supporting means for said lower plate including a first, downwardly facing plane bearing surface fixed with said plate and parallel therewith, a second upwardly facing plane bearing surface horizontally fixed below and parallel with said first surface, a first plurality of anti-friction balls interposed between said first and second surfaces and in contact with both, an upper plate oscillatable in its own plane parallel with and closely spaced above said lower plate, a third upwardly facing plane bearing surface fixed with said upper plate and parallel therewith, a fourth downwardly facing horizontally fixed bearing surface above spaced from said third surface, and a second plurality of anti-friction balls interposed between said third and fourth surfaces and in contact with both, a fixed abutment over said upper plate, force means interposed between said fixed abutment and said fourth bearing surface and operable to exert a controlled variable vertical force urging said fourth bearing surface downwardly to vary the pressure which said plates exert upon a sheet of glass interposed therebetween, and means connected with said plates to impart thereto equal and opposite orbital movements, each in its own plane.

2. The apparatus of claim 1, said force means comprising a fluid pressure cylinder having a vertical axis fixed with said abutment above said fourth bearing surface, a piston slidably fitting said cylinder, a rod fixed to said piston and having its lower end fixed with said fourth bearing surface, and means for introducing fluid under pressure into said cylinder above said piston, to exert a force through said second plurality of balls, urging said plates together with selectively variable force.

3. An apparatus for surfacing sheets of glass, comprising, first and second superposed, horizontally parallel, lower and upper surfacing plates adapted to receive between them a glass sheet to be surfaced, first antifriction ball bearing means mounting said first plate for oscillation in its own plane, second antifriction ball bearing means mounting said second plate for oscillation in its own plane, power-driven means connected with said plates to simultaneously oscillate the same equally and in opposite directions, each in its own plane, and means operable to urge said plates toward each other with selectively variable force to correspondingly vary the pressure of said plates upon a sheet of glass interposed therebetween.

4. The apparatus of claim 3, each said antifriction means including a pair of vertically spaced horizontal bearing plates and a plurality of balls interposed therebetween, one plate of each said pair being fixed and the other plate of each said pair being connected with a respective one of said surfacing plates for oscillation as a unit therewith.

5. In an apparatus for simultaneously surfacing both faces of a sheet of glass, first, second, third and fourth superposed bearing supports, top to bottom, in the order mentioned, said first and third supports each having a downwardly-facing plane horizontal surface, said second and fourth supports each having an upwardly-facing plane horizontal surface, first, second, third and fourth bearing plates each secured to and over a respective one of said surfaces, a first plurality of antifriction bearing balls between said first and second plates and in contact with each, a second plurality of antifriction bearing balls between said third and fourth plates and in contact with each, an upper horizontally planar rubbing tool fixed with and beneath said second bearing support, a lower horizontally planar rubbing tool fixed with and above said third bearing support, said tools being vertically spaced to receive therebetween a sheet of glass to be surfaced, means mounting said first and fourth bearing supports against horizontal movement, power-driven means connected with said tools to oscillate the same equally and oppositely in horizontal orbital movement, and means operable to urge said first bearing support downwardly with selectively variable force to thereby vary the pressure of each said rubbing tool on the respective faces of a sheet of glass therebetween.

6. The apparatus of claim 5, said last-named means comprising a vertically-disposed fixed cylinder, a piston slidably fitting said cylinder, a rod fixed with said piston and extending downwardly therefrom, said first bearing support being fixed to the lower end of said rod, and conduit means to introduce pressure fluid into said cylinder to urge said first bearing support downwardly with controllable variable force.

7. The apparatus of claim 6, and means supporting said fourth bearing support and operable to vertically adjust the same.

8. The apparatus of claim 5, and a film of plastic material between each said bearing support and its respective plate.

9. Apparatus for surfacing sheets of glass, comprising, first and second spaced horizontal rubbing tools adapted to receive between them a sheet of glass to be surfaced, means mounting said tools for circular translational motion and including upper and lower pairs of parallel bearing plates, a plurality of sets of antifriction bearing balls, one set being interposed between each said pair of bearing plates, respectively, each plate of one said pair being horizontally fixed and the other plate of each said pair being connected to a respective one of said rubbing tools, means operable to urge all said plates, and thereby said tools, together with controllable variable force, and means connected with said tools and moving the same equally and oppositely in horizontal orbital movement.

References Cited by the Examiner

UNITED STATES PATENTS

| 1,616,240 | 2/27 | Symons | 308—230 X |
| 2,984,051 | 5/61 | Monnet et al. | 51—119 |
| 3,035,377 | 5/62 | Bovensiepen et al. | 51—111 |
| 3,107,457 | 10/63 | Walters et al. | 51—119 X |

FOREIGN PATENTS

| 567,551 | 5/58 | Belgium. |
| 890,520 | 11/43 | France. |
| 566,608 | 1/45 | Great Britain. |

J. SPENCER OVERHOLSER, *Primary Examiner.*